March 10, 1970 A. M. BEST ET AL 3,499,381
HARVESTER AND BALER COMBINATION
Filed Feb. 27, 1967 4 Sheets-Sheet 2
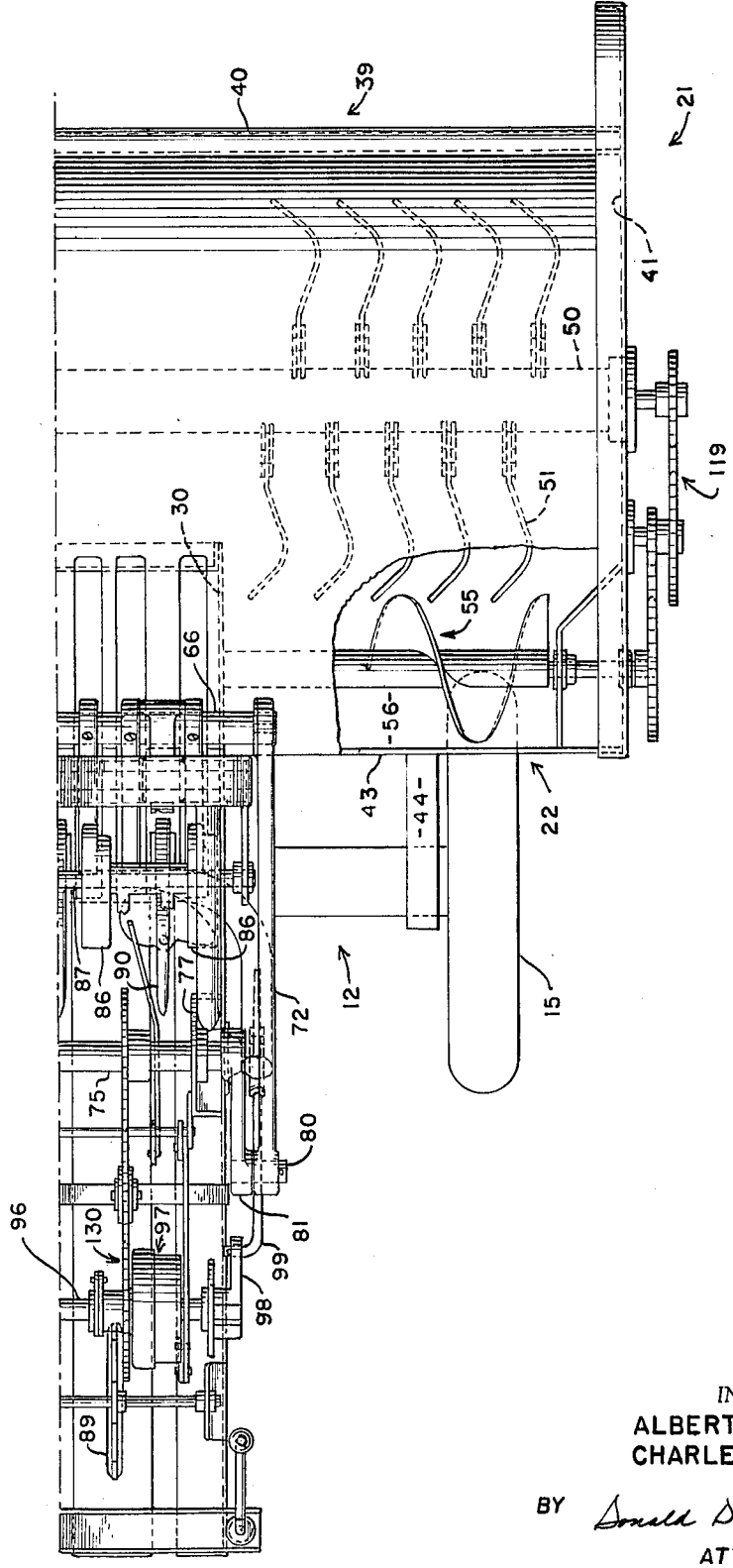
INVENTORS
ALBERT M. BEST &
CHARLES M. KLINE
BY
ATTORNEY March 10, 1970  A. M. BEST ET AL  3,499,381
HARVESTER AND BALER COMBINATION Filed Feb. 27, 1967  4 Sheets-Sheet 3

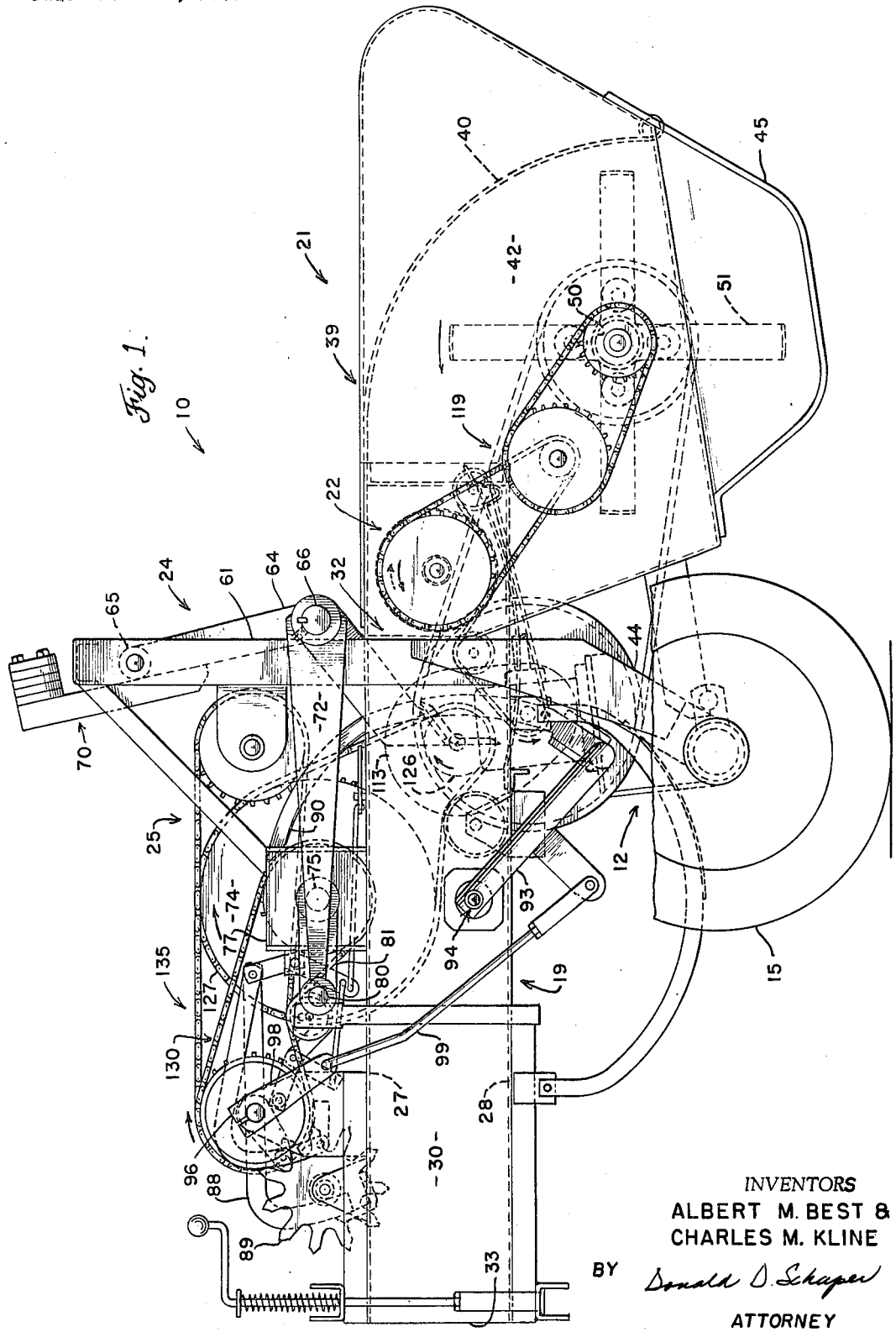

INVENTORS
ALBERT M. BEST &
CHARLES M. KLINE
BY Donald D. Schaper
ATTORNEY

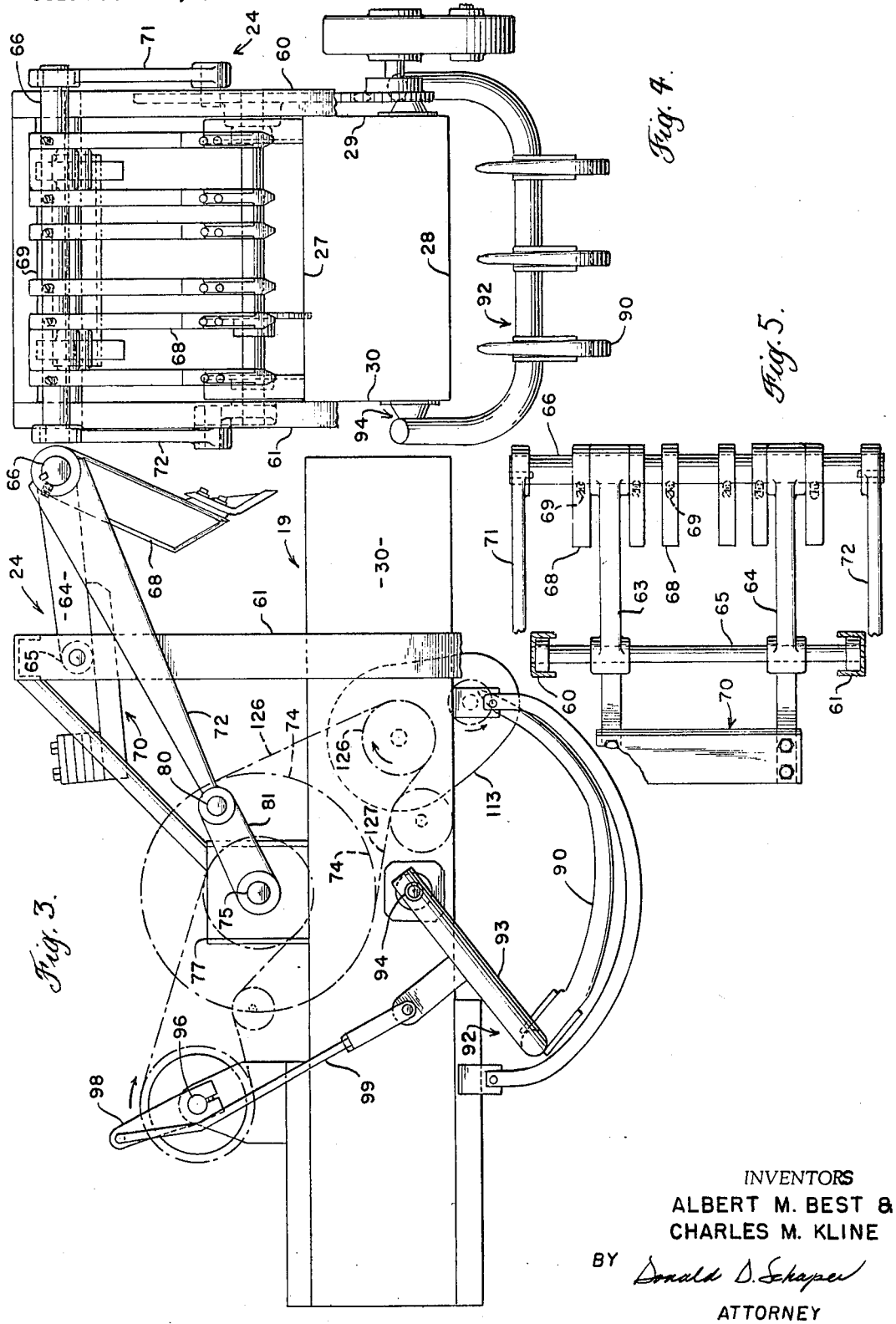

United States Patent Office 3,499,381
Patented Mar. 10, 1970

3,499,381
HARVESTER AND BALER COMBINATION
Albert M. Best, New Holland, and Charles M. Kline, Reinholds, Pa., assignors to Sperry Rand Corporation, New Holland, Pa., a corporation of Delaware
Filed Feb. 27, 1967, Ser. No. 618,686
Int. Cl. B30b *15/00, 1/26*
U.S. Cl. 100—100                                    3 Claims

ABSTRACT OF THE DISCLOSURE

An agricultural machine adapted to travel through a field and having a rotatable flail-type pickup at a forward end which is adapted to sever crop material and deliver it into a bale case in line with the pickup, and a bailing mechanism operable in the bale case for forming the crop material into bales.

BACKGROUND OF THE INVENTION

The conventional hay baler comprises a bale case extending in the direction of travel and having a hay receiving platform located along one side wall of the bale case. A pickup, mounted in front of the platform, is adapted to elevate previously cut crop material from the ground and to deposit the crop material on the platform. A feeder mechanism operates over the platform in a direction transverse to the direction of travel to convey the hay into the bale case through an opening in the side wall. Operative in the bale case, and reciprocable in a fore-and-aft direction, is a plunger which moves rearwardly of the infeed opening on a working stroke and then retracts to a position forwardly of the opening to permit a new charge of hay to be fed into the bale case. The direction which the hay travels successively changes from rearward, to lateral, to rearward again.

To eliminate direction changes and to simplify the mechanism employed between the hay pickup and the final bale formation, balers of the so-called straight-through type have been provided. In such balers, hay is fed into a bale case through an infeed opening at the forward end of the bale case. The bale case extends in a fore-and-aft direction relative to the ground travel, and the infeed opening is directly behind the pickup. It is common to employ a single bale forming plunger which is mounted for swinging movement about a horizontal axis. A suitable feeder conveys the hay from the pickup to the plunger between working strokes thereof.

Straight-through balers designed heretofore have not found general acceptance. This has been due in some measure to the low capacity of the balers and to the relatively low bale density obtainable with them. Various feeder and plunger designs have been proposed in an attempt to increase the baler capacity. One problem in these designs has been that of providing a means for periodically cutting through the fibrous material so that successive bales are not held together by intertwined crop material. This problem is solved by mounting a knife on the plunger in conventional balers, and this has been one approach in straight-through balers with swinging plungers. The use of a knife on a swinging plunger, however, limits the path of travel through which the plunger can be made to pass, and thus, in some crops and conditions limits the effectiveness of the plunger.

SUMMARY OF THE INVENTION

In summary this invention comprises pivotally mounting the packer fingers on the ends of rotatable arms and actuating the packer fingers by a crank positioned forwardly of the rotatable arms through a bar rotatably connected to the orbiting end of the crank and rigidly connected to the packer fingers to move the packer fingers rearward in a compression stroke.

A principal object of this invention is to provide a machine of the type described which is capable of relatively high capacity, forms bales of desirable density, and is more compact and economical to manufacture than balers of conventional design.

Another object of this invention is to provide a machine which is adapted to sever standing crop material, such as corn stalks, and shred the material sufficiently so that the material can be compressed and formed into bales without the need for knife means on the compressing device.

A further object of this invention is to provide a packer in a straight-through type baling device which is adapted to follow a path in the return stroke which is above the path of the packer in the compression stroke so that the inflow of crop material is not obstructed by the returning packer.

A still further object of this invention is to provide a feeder in a straight-through baling mechanism which delivers material into the bale case from opposite sides thereof.

Other objects of this invention will be apparent hereinafter from the specification and from the recital in the appended claims.

BRIEF DESCRIPTION OF THE DRAWINGS

FIG. 1 is a side elevational view of the machine of this invention and showing the packer fingers at the end of a compression stroke;

FIGS. 2*a* and 2*b*, taken together, represent a plan view of FIG. 1;

FIG. 3 is a fragmentary side elevational view showing the packer fingers at the beginning of a compression stroke;

FIG. 4 is an end view of FIG. 3; and

FIG. 5 is a plan view of the packer means.

DESCRIPTION OF THE PREFERRRED EMBODIMENT

Figure 2B:
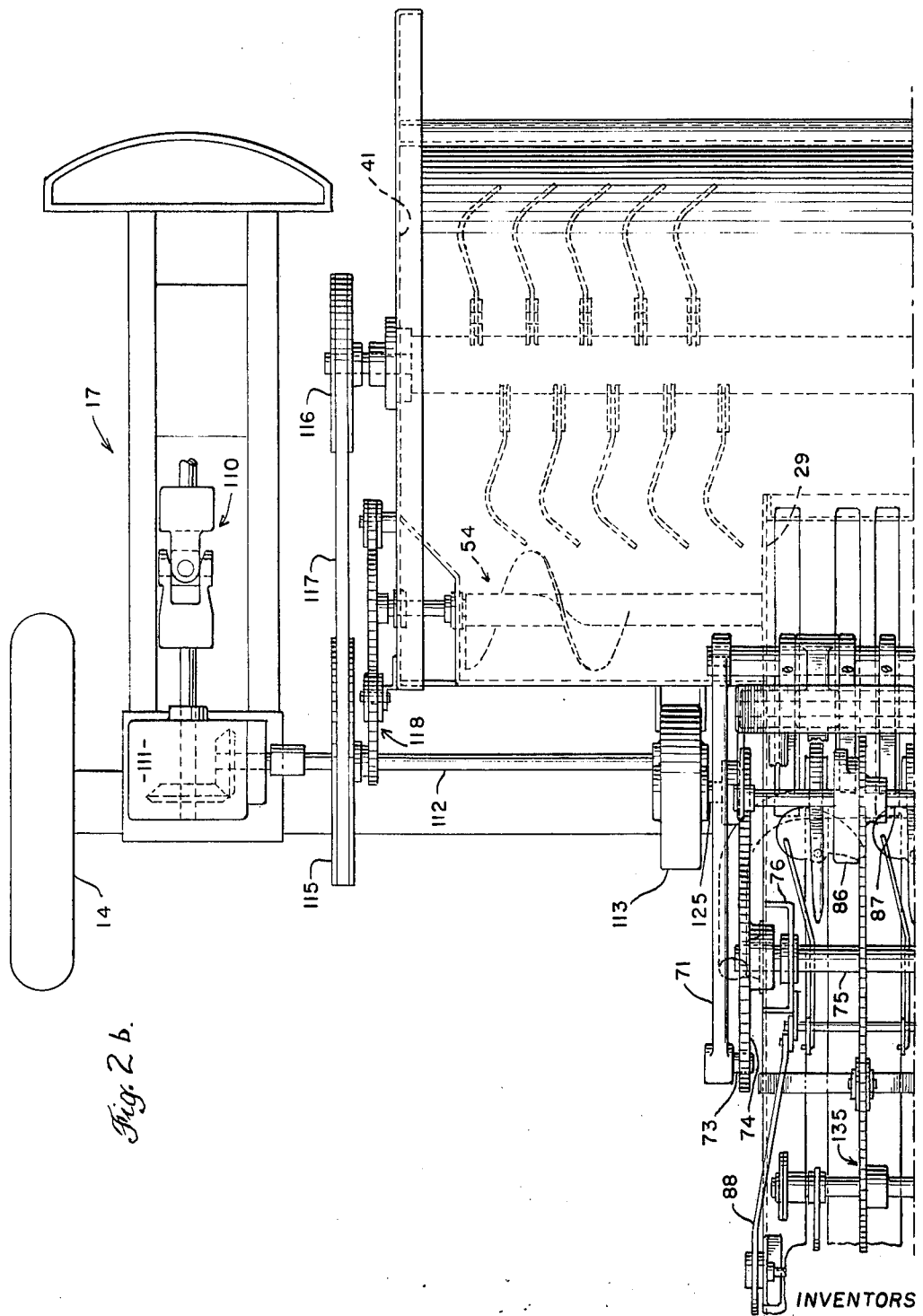

Referring now to the drawings by numerals of reference and particularly to FIG. 1, the machine of this invention is designated generally 10. Machine 10 comprises a main frame 12 supported on a pair of ground wheels 14 and 15, and a draft frame 17 connected to main frame 12, along what will be referred to as the inboard side, and extending forward for connection to a towing vehicle, not shown. An elongated bale case 19 is supported on main frame 12 and extends in a fore-and-aft direction. A crop gathering unit 21 is supported on frame 12 forwardly of bale case 19 and extends laterally from adjacent draft frame 17 to the outboard side of the machine. Crop gathering unit 21 is adapted to deliver crop material to a feeder 22 located rearwardly of the crop gathering unit. Feeder 22 consolidates the material and delivers it into bale case 19. A packer 24 moves the material rearwardly in the bale case and compresses it into bales. A tying mechanism 25 binds the crop material with wire or string to complete the baling operation.

Bale case 19 comprises a top wall 27, a bottom wall 28, and a pair of side walls 29 and 30. Crop material is received through an infeed opening 32 at the forward end of the bale case, and the completed bales exit through a discharge opening 33 at the rear end of the bale case.

Crop gathering unit 21 comprises a housing 39 having an arcuate top wall 40 which is joined to top wall 27 of bale case 19, and a pair of vertically extending side panels 41 and 42 arranged on opposite ends of top wall 40. A cross member 43 extends between side panels 41 and 42 and is connected to frame 12 through support elements 44. A skid shoe 45 extends downwardly from each of the side panels 41 and 42. An elongated rotor shaft 50 is journalled in side panels 41 and 42, and a plurality of flail-like knives 51 are mounted in spaced relation on the rotor shaft. A drive system for the rotor shaft will be described hereinafter.

Feeder 22 is mounted rearwardly of the rotor and comprises a pair of auger sections 54 and 55 which operate respectively in troughs 56 and 57 located at the rear upper end of housing 39 and extending on opposite sides of bale case 19.

Packer 24 comprises a pair of supports 60 and 61 which extends upwardly from machine frame 12 on opposite sides of bale case 19. As best shown in FIGS. 3–5, a pair of swing arms 63 and 64 are mounted to a cross bar 65 which is pivotally mounted in vertical supports 60 and 61. A packer finger rockshaft 66 is journalled in the radially outward ends of swing arms 63, and 64. Material engaging means comprise a plurality of packer fingers 68 which are fixed to rockshaft 66 by means of set screws 69. A counterweight 70 is connected to arms 63 and 64 to reduce vibrations in the packer. Movement is transmitted to the packer fingers bars 71 and 72 keyed to opposite ends of rockshaft 66. Bar 71 is connected through a crank pin 73 to a drive sprocket 74 carried on a crank shaft 75. Shaft 75 is journalled in supports 76 and 77 on bale case 19. Bar 72 is connected by means of crank pin 80 to crank 81 which is keyed to crank shaft 75.

Tying mechanism 25 is of generally conventional construction and comprises knotters 86 mounted on knotter shaft 87. A trip arm 88 is actuated by metering wheel 89 in a well known manner. Curved tying needles 90 are fixed at their rear ends to a transverse yoke 92 having upwardly extending ends 93 which are pivoted at 94 to the sides of bale case 19. A cross shaft 96 operates through a one revolution clutch 97 to rotate arm 98. Arm 98 is connected to a rod 99 fixed to yoke 92.

Drive means for the various baler components is supplied through a shaft 110 connected to a tractor, not shown, and which extends rearwardly to a gearbox 111. An output shaft 112 extends from gearbox 111 to a second gear box 113 located adjacent bale case 19. A drive sheave 115 on shaft 112 furnishes power to the sheave 116 on rotor shaft 50 through a drive belt 117. A chain drive 118 furnishes power to the shaft of auger 54. A second chain drive 119 adjacent side panel 42 furnishes power to auger 55.

An output shaft 125, extending from gearbox 113, drives sprocket 74 through a sprocket 126 and a chain 127. A chain drive 130 extends rearwardly from crank shaft 75 to drive the needle drive means, and a chain drive 135 extends forwardly from cross shaft 96 to drive the knotters.

In operation, machine 10 is drawn through a field in a forward direction by a tractor, not shown. The various components of the machine are driven by the tractor power take-off through shaft 110. Flail knives 51 serve to sever the crop material, fling it upward and rearward into the consolidating means 22. The cross augers 54 and 55 deliver the material into the bale case and onto bottom wall 28. Packer fingers 66 move the material rearwardly and compress it into bales.

This invention can be efficiently operated in all types of crop material. The provision of a crop gathering unit which reduces long fibrous material into short lengths permits the use of packer and feeder mechanisms which are specially constructed to handle material in short lengths. These mechanisms so constructed are more efficient, and less costly to manufacture, than packer and feeder mechanisms which must be designed to handle all lengths of crop material. The cutting means, normally required on the packer mechanism, has been eliminated, and a more efficient packer has been obtained thereby. As noted previously, the packer fingers are lifted at the end of the compression stroke so that the inflow of material is not obstructed by the fingers on the return stroke.

In the novel feeder, feeder augers uniformly convey the shredded crop material into the bale case from opposite sides thereof. A portion of the crop material is also moved directly into the bale case through the front of the bale case by the crop gathering unit. Thus, material is being fed into the bale case from three directions. It has been found that the baler capacity is increased by this feeder system, and a very desirable bale shape is produced.

In crop materials, such as corn stalks, the disclosed crop gathering unit having flail knives is necessary to reduce the crop material to short lengths, so that all of the benefits of the disclosed feeder and packer can be obtained. In the event the machine is employed to bale materials, such as leaves, a conventional, or in lieu thereof a brush type, pickup can be used since no further reduction of the material is desired.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains.

Having thus described our invention, what we claim is:

1. In an agricultural machine having a wheel supported frame including a bale case;
   packer means for moving material rearwardly in said bale case and compressing material into bales,
   said packer means comprising
      vertically extending support means mounted on said frame adjacent said bale case,
      arm means pivotally mounted on said support means for swinging movement about the pivotal mounting,
      shaft means carried by said arm means remote from the pivotal mounting,
      material engaging means mounted on said shaft means for swinging movement relative to said arm,
      crank means rotatably mounted on the frame to orbit one end about a horizontal axis transverse to said bale case, and means attached to said material engaging means and attached to said crank means for moving said material engaging means downward and rearward in a compression stroke and upward and forward through a return stroke for changing the attitude of said material engaging means relative to said bale case on movement of the crank means through a cycle of operation.

2. In an agricultural machine as set forth in claim 1 wherein said support means comprises two vertically extending supports on opposite sides of said bale case.

3. In an agricultural machine as set forth in claim 1 wherein said material engaging means are finger-like members fixedly attached to said shaft means.

References Cited

UNITED STATES PATENTS

| | | | |
|---|---|---|---|
| 2,431,828 | 12/1947 | Raney | 56—341 |
| 2,498,319 | 2/1950 | Vultz et al. | 100—189 X |
| 2,775,339 | 12/1956 | Cadier | 56—341 |
| 2,817,945 | 12/1957 | McClellan | 56—341 X |
| 2,839,981 | 6/1958 | Harstick et al. | 56—341 X |
| 2,843,989 | 7/1858 | McClellan | 56—341 X |
| 2,917,993 | 12/1959 | Nikkel | 100—189 X |
| 3,174,425 | 3/1965 | Eby et al. | 100—189 X |

RUSSELL R. KINSEY, Primary Examiner

U.S. Cl. X.R.

100—189